No. 617,370. Patented Jan. 10, 1899.
T. J. TELLEFSEN.
ROLLER BEARING SPINDLE STEP.
(Application filed Mar. 31, 1898.)
(No Model.) 2 Sheets—Sheet 1.

Attest:
L. Lee.
Edw. F. Kinsey.

Inventor.
Theodor J. Tellefsen, per
Thomas S. Crane, Atty.

No. 617,370. Patented Jan. 10, 1899.
T. J. TELLEFSEN.
ROLLER BEARING SPINDLE STEP.
(Application filed Mar. 31, 1898.)
(No Model.) 2 Sheets—Sheet 2.
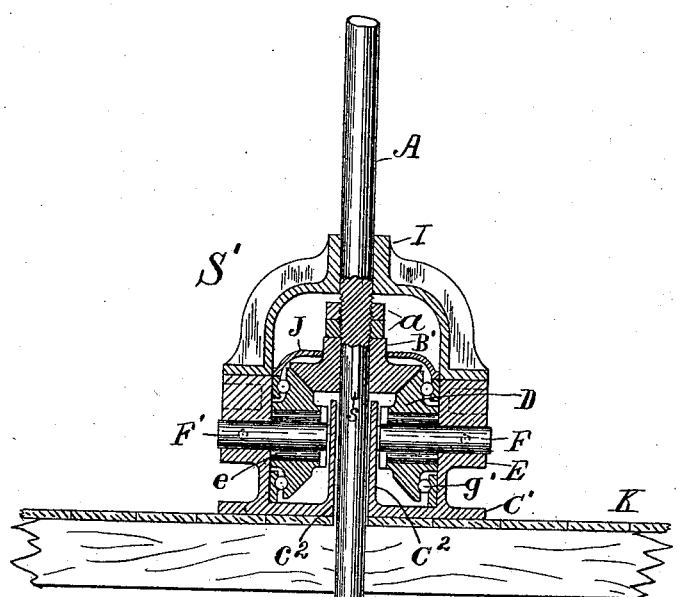
Fig. 6.
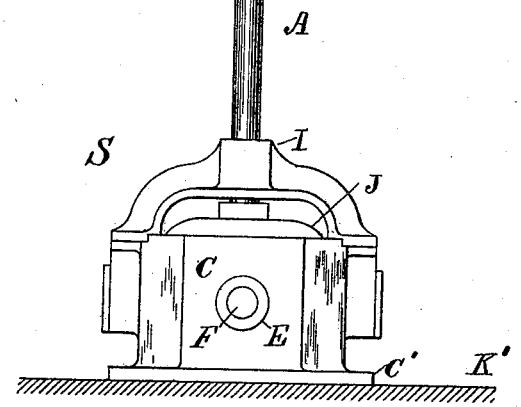
Attest:
L. Lee.
Edw. F. Kinsey.
Inventor
Theodore J. Tellefsen, per
Thomas S. Crane, Atty.
THE NORRIS PETERS CO., PHOTO-LITHO., WASHINGTON, D. C.

UNITED STATES PATENT OFFICE.

THEODOR J. TELLEFSEN, OF NEWARK, NEW JERSEY.

ROLLER-BEARING SPINDLE-STEP.

SPECIFICATION forming part of Letters Patent No. 617,370, dated January 10, 1899.

Application filed March 31, 1898. Serial No. 676,021. (No model.)

*To all whom it may concern:*

Be it known that I, THEODOR J. TELLEFSEN, a citizen of the United States, residing at Newark, county of Essex, State of New Jersey, have invented certain new and useful Improvements in Roller-Bearing Spindle-Steps, fully described and represented in the following specification and the accompanying drawings, forming a part of the same.

The present improvements relate to a means for supporting vertical spindles which carry a heavy load, the spindle for the purposes of this invention being provided at the bottom end with a bearing-wheel having a conical face. Such bearing-wheel is supported upon a series of step-wheels fitted to the under side of the bearing-wheel and supported each upon a horizontal axle with antifriction-bearings. The conical face of the bearing-wheel produces an outward thrust upon the supporting-wheels, and such thrust is sustained by a series of balls fitted to an adjustable ball-race at the back of each supporting-wheel. The axles of the supporting or step wheels may be stationary and the interior of the supporting-wheel provided with rolls to turn upon the same, or the axle may be fixed in the supporting-wheel and revolved in roller-bearings at its opposite ends. By such construction all of the pressure upon the supporting-wheels is sustained by balls or rolls, which reduce the friction to the lowest possible point. The supporting-wheels are preferably mounted within a casing adapted to contain a bath of oil and the casing provided at the top with a bearing for the vertical spindle and with a cover to inclose the supporting-wheels, so that the mechanism may be revolved in the oil-bath without losing the oil from the casing. By this construction the parts are rendered very durable and the friction is reduced in the highest degree. The supporting-wheels are termed "step-wheels" herein, and four of them are shown journaled in the casing to support the bearing-wheel; but any other suitable number of the step-wheels may be applied to support the bearing-wheel.

The invention will be understood by reference to the annexed drawings, in which—

Figure 1:
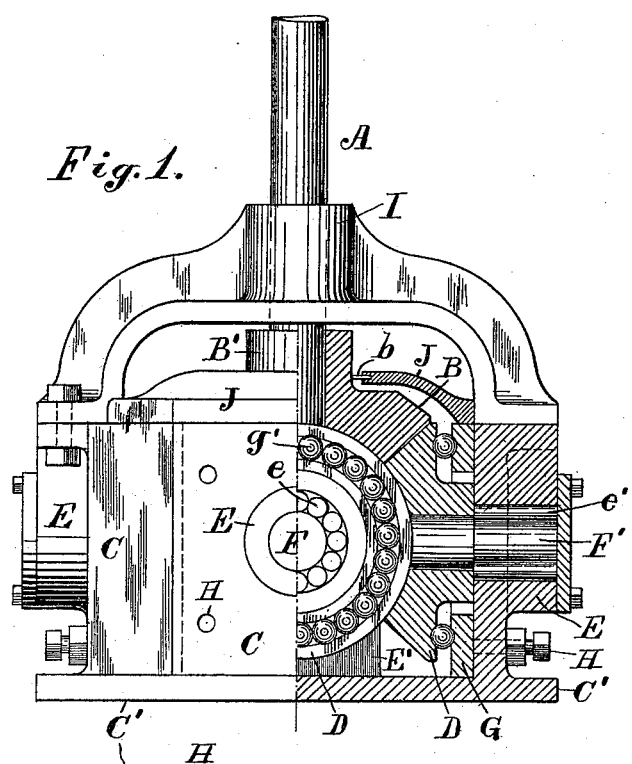
Figure 5:
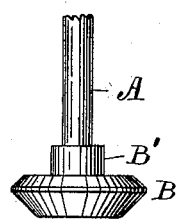
Figure 4:
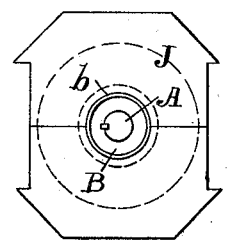
Figure 2:
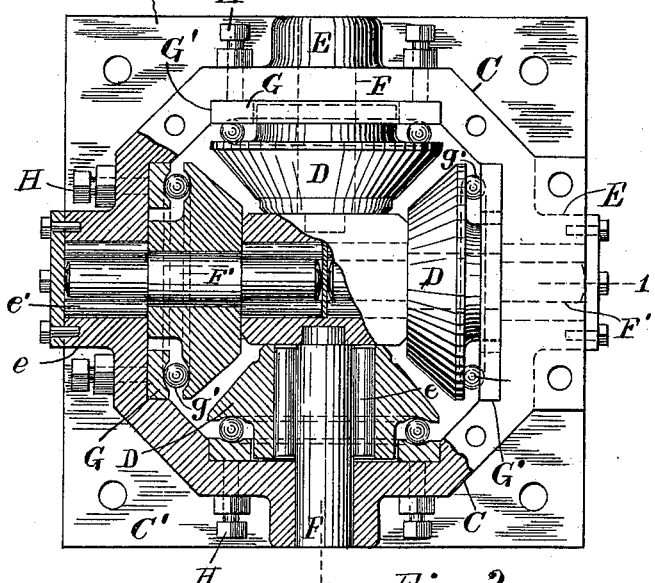
Figure 3:
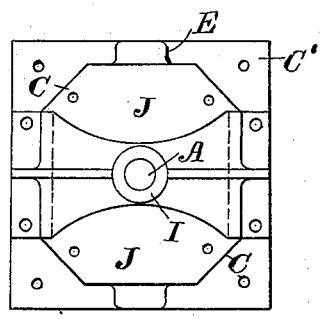

Figure 1 is an elevation of a spindle-step embodying my improvements, with the parts in section, upon line 1 1 in Fig. 2. Fig. 2 is a plan of the same with the cover and spindle-bearing removed and the parts in section where hatched at the center of the supporting or step wheel axles. Fig. 3 is a plan of the bearing complete, drawn upon one-half the scale of Fig. 2; and Fig. 4 is a plan of the cover and the hub of the bearing-wheel. Fig. 5 is an elevation of the spindle and its bearing-wheel upon the same scale as Figs. 3 and 4. Fig. 6 shows two of the bearings operating conjointly to support the same shaft, the upper bearing being represented in section.

In Figs. 1 and 2, A designates the spindle, and B the bearing-wheel upon the lower end of the same.

C designates the casing, formed with a bed-plate C' and four bearings E for the step-wheels D. The casing is shown formed of an octagonal flange projected upwardly from the bed-plate, with which it would be commonly cast all in one piece, the whole forming a cup-shaped receptacle within which the step-wheels revolve and which is adapted to retain the oil in contact with such wheels and their bearings. The bearings for the axles may be formed wholly in the surrounding casing by making the axles stationary and rotating the step-wheels thereon; but for a large construction a central bearing E' may be provided to support the inner end of each axle by projecting a column upwardly from the center of the base within the casing. The axles are thus supported at both ends and are much less liable to bend or yield when supporting a heavy load.

Two of the step-wheel axles (designated F) are fixed in the bearings E, and the corresponding step-wheels are bored larger than such axles and lined with a series of antifriction-rolls $e$, as shown at the right side of the center line in Fig. 1 and at the lower part of Fig. 2. Two of the axles (designated F') are fixed in the wheels D and are projected from the outer sides of such wheels into the bearings E and from their inner sides into the central bearing E'. The bearings E and E', which sustain the ends of the axles F', are provided with antifriction-rolls $e'$, and all of the step-wheels are thus sustained upon rollers. Behind each step-wheel a plate G is fitted within the casing and formed with an annular groove $g$ to receive a series of antifriction-balls $g'$. A corresponding groove is formed in the back of each step-wheel to fit the outer sides of such balls.

The plates or ball-races G are made rectangular and fitted to recesses G', which are formed around each of the axles F and F' upon the inner sides of the casing. Such recesses hold them from turning, and set-screws H, inserted through the walls of the casing, serve to press them inwardly to adjust the four step-wheels into equal contact with the bearing-wheel B.

The casing is extended to the tops of the step-wheels, and an arch-bearing I is mounted upon the casing to support the spindle A just above the bearing-wheel. The arch-bearing is formed with feet which are bolted upon the top of the casing. A cover J is also applied to the top of the casing and fitted around the hub B' of the bearing-wheel to prevent the oil from splashing from the casing when the spindle is rotated. The cover is divided in halves, as shown in Fig. 4, to permit its convenient removal, and its inner edge is provided with a flexible packing $b$, which is fitted to the hub B' to exclude dust and dirt from the interior of the casing.

It will be readily understood that the centrifugal force discharges outwardly all the oil which is thrown upon the bearing-wheel B, and there is therefore no tendency for the oil to escape at the packing $b$. The packing may, if preferred, be fitted to the spindle A instead of the hub B'.

Where the spindle is of excessive weight or extends vertically through two floors of a building or through different parts of a high machine, two of the bearing-wheels may be applied to the shaft and sustained by separate steps. In such case one or both of the bearing-wheels are made adjustable to distribute the load upon the steps in a suitable manner.

Fig. 6 shows upper and lower floors K K' in a building provided with separate steps (designated by the letters S and S') and the shaft A extended through the floor K and having the auxiliary step S', supported upon such floor. The bearing-wheel B for such auxiliary step is secured adjustably upon the shaft by a spline $s$ and jam-nuts $a$, fitted to a thread upon the shaft. Where the shaft passes through an opening $c^2$ in the bottom of the step, as in the auxiliary step, oil may be retained within the casing by extending a sleeve or tube $C^2$ upward from the bed-plate C' nearly to the bearing-wheel. When the step-wheels are adjusted in the step, they revolve between the sleeve $C^2$ and the casing C, and the space in which they revolve may be supplied with a considerable charge of oil, so that the step-wheels may dip therein. The tube $C^2$ is shown extended above the axles of the step-wheels, and the oil may thus be filled within the casing to the level of such axles, so as to lubricate all the bearings most effectively.

The auxiliary step is shown furnished with the cover J to retain within the bearing the oil which would otherwise be thrown from the edges of the bearing-wheel and step-wheels. In adjusting such a construction the weight is first thrown wholly upon one or the other of the steps and the nuts $a$ are then adjusted so as to transfer a portion of the load to the other step, after which the weight is supported by both and excessive strain upon either is avoided.

It is obvious that the step shown in Figs. 1 and 2 may be applied to the end of a horizontal shaft and the construction operate to retain the oil within the tight casing, while it is equally true that the two steps shown in Fig. 6 may be applied to a horizontal shaft to form thrust-bearings for conjointly supporting the thrust. The term "step" will therefore be understood in the present specification to include a support for a horizontal or vertical shaft.

Having thus set forth the nature of the invention, what I claim herein is—

1. The combination, with the spindle A and bearing-wheel B, of the spindle-step comprising the bed-plate C' provided with a series of horizontal axle-bearings E, axles fitted to such bearings, step-wheels D supported thereby and fitted to the under side of the bearing-wheel B, a ball-race fitted movably to the inner side of each bearing with balls in contact with the outer side of the adjacent step-wheel, and means for pressing the ball-races inwardly, substantially as herein set forth.

2. The combination, with the spindle A and bearing-wheel B, of the spindle-step comprising the bed-plate C' having the four axle-bearings E upon the same, axles fitted to such bearings, step-wheels D fitted to the under side of the bearing-wheel B, and having internal rollers fitted to such axles, a ball-race fitted movably to the inner side of each bearing with balls in contact with the outer side of the adjacent step-wheel, and screws for pressing the ball-races inwardly, substantially as herein set forth.

3. The combination, with the spindle A and bearing-wheel B, of the spindle-step comprising the bed-plate C' having the four axle-bearings E upon the same, two horizontal axles fitted to such bearings and having step-wheels D fitted to the under side of the bearing-wheel, and having internal rollers fitted to the said axles, rolls fitted to the two other bearings with two axles fitted therein, and step-wheels mounted thereon as set forth, a ball-race fitted movably upon the inner side of each bearing with balls in contact with the outer side of such step-wheels, and screws for pressing the ball-races inwardly, substantially as herein set forth.

4. The combination, with the spindle A and bearing-wheel B, of the spindle-step comprising the casing C having the bed-plate C' forming a cup-shaped oil-receptacle, axle-bearings E formed in the sides of such casing, and a bearing E' extended upwardly from the bed-plate in the center of the casing, horizontal axles extended from the bearings E into the central bearing E', and step-wheels supported by such axles and fitted to the under side of the bearing-wheel, substantially as herein set forth.

5. The combination, with the spindle A and bearing-wheel B, of the spindle-step comprising the casing C having the bed-plate C' forming a cup-shaped oil-receptacle, axle-bearings formed in the sides of such casing with horizontal axles fitted thereto, step-wheels supported by such axles and fitted to the under side of the bearing-wheel, and a cover applied to the top of the casing and extended over the top of the bearing-wheel, to retain the oil upon all of the wheels within the casing, substantially as herein set forth.

6. The combination, with the spindle A and bearing-wheel B, of the spindle-step comprising the casing C having the bed-plate C' forming a cup-shaped oil-receptacle, axle-bearings formed in the sides of such casing with horizontal axles fitted thereto, step-wheels supported by such axles and fitted to the under side of the bearing-wheel, an arch-bearing for the spindle having feet supported upon the casing, and a cover applied to the top of the casing between the bearing-wheel and the arch-bearing, and extended toward the shaft or hub of the bearing-wheel, to retain the oil upon all of the wheels within the casing, substantially as herein set forth.

7. The combination, with the spindle A and bearing-wheel B, of the spindle-step comprising the casing C having the bed-plate C' forming a cup-shaped oil-receptacle, axle-bearings formed in the sides of such casing with horizontal axles fitted thereto, step-wheels supported by such axles and fitted to the under side of the bearing-wheel, an arch-bearing for the spindle having feet supported upon the casing, and a divided cover secured tightly upon the top of the casing and having a central opening provided with a packing around the shaft or bearing-wheel hub, to exclude dust and dirt from the casing, substantially as herein set forth.

8. The combination, with the spindle A, of two steps provided each with a series of step-wheels having axles and bearings at right angles to the spindle, two bearing-wheels upon the spindle to rest upon the step-wheels of the two steps, and means for adjusting one of the bearing-wheels upon the spindle to divide the load transmitted by the two bearing-wheels to the step-wheels of the respective steps, substantially as herein set forth.

9. The combination, with the spindle A having the bearing-wheel B at one end, of the step having step-wheels D fitted to the said bearing-wheel and provided with suitable axles and bearings, an auxiliary bearing-wheel upon the shaft, an auxiliary step having the shaft extended through the same adjacent to such auxiliary bearing-wheel, and provided with step-wheels fitted thereto, and means for adjusting the auxiliary bearing-wheel longitudinally upon the shaft, to divide the load between the two bearing-wheels and their respective steps, substantially as herein set forth.

10. The combination, with the spindle A and bearing-wheel B, of the spindle-step comprising the casing C having the bed-plate C' provided with the central aperture $c^2$ in the bottom with sleeve $C^2$ extended upward therefrom, axle-bearings formed in the sides of such casing with horizontal axles fitted thereto, step-wheels supported by such axles between the sides of the casing and the central sleeve, and fitted to the bearing-wheel upon the spindle, as and for the purpose set forth.

In testimony whereof I have hereunto set my hand in the presence of two subscribing witnesses.

THEODOR J. TELLEFSEN.

Witnesses:
THOMAS S. CRANE,
EDWARD F. KINSEY.